United States Patent
Niwa et al.

(10) Patent No.: US 6,747,265 B1
(45) Date of Patent: Jun. 8, 2004

(54) OPTICAL CANTILEVER HAVING LIGHT SHIELDING FILM AND METHOD OF FABRICATING THE SAME

(75) Inventors: Takashi Niwa, Chiba (JP); Susumu Ichihara, Chiba (JP); Yasuyuki Mitsuoka, Chiba (JP); Kenji Kato, Chiba (JP); Norio Chiba, Chiba (JP); Manabu Oumi, Chiba (JP); Nobuyuki Kasama, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/830,381
(22) PCT Filed: Nov. 2, 1999
(86) PCT No.: PCT/JP99/06121
§ 371 (c)(1),
(2), (4) Date: Jul. 12, 2001
(87) PCT Pub. No.: WO00/28299
PCT Pub. Date: May 18, 2000

(30) Foreign Application Priority Data

Nov. 11, 1998 (JP) .......................................... 10/320768

(51) Int. Cl.[7] .................................................. H01J 5/16
(52) U.S. Cl. ..................................... 250/216; 250/234
(58) Field of Search .............................. 250/216, 234, 250/306–311; 73/105

(56) References Cited

U.S. PATENT DOCUMENTS

| | | | | |
|---|---|---|---|---|
| 5,116,462 A | * | 5/1992 | Bartha et al. .................. 216/2 |
| 5,751,686 A | * | 5/1998 | Kuroda et al. .............. 369/126 |
| 5,753,911 A | * | 5/1998 | Yasuda et al. .............. 250/306 |
| 6,194,711 B1 | * | 2/2001 | Tomita ........................ 250/234 |
| 6,201,226 B1 | * | 3/2001 | Shimada et al. ......... 250/201.3 |

FOREIGN PATENT DOCUMENTS

| JP | 08-166390 | * | 6/1996 |
|---|---|---|---|
| JP | 08-334521 | * | 12/1996 |
| JP | 09-054101 | * | 2/1997 |

* cited by examiner

Primary Examiner—Thanh X. Luu
(74) Attorney, Agent, or Firm—Adams & Wilks (57) ABSTRACT

An optical cantilever for an SNOM has a base portion, a cantilever portion extending from the base portion and having a hole formed proximate a distal end thereof, a dielectric member extending through the hole and having a sharpened tip at a first end projecting outward of a first surface of the cantilever portion, and a light shielding film covering the first surface of the cantilever portion and the first end of the dielectric member except for a portion of the sharpened tip so as to form a very small aperture at the sharpened tip which is not covered by the light shielding film.

10 Claims, 9 Drawing Sheets

PRIOR ART

OPTICAL CANTILEVER HAVING LIGHT SHIELDING FILM AND METHOD OF FABRICATING THE SAME

CROSS-REFERENCE TO RELATED APPLICATION

This application is a U.S. national stage application of copending International Application Ser. No. PCT/JP99/06121, filed Nov. 2, 1999 claiming a priority date of Nov. 11, 1998, and published in a non-English language.

TECHNICAL FIELD

The present invention relates to an optical cantilever for observing the shape of a sample by utilizing an atomic force occurring between substances and measuring optical characteristics in a very small area, and to a method of fabricating such an optical cantilever.

BACKGROUND OF THE INVENTION

At present, using a scanning type near-field microscope (hereinafter, abbreviated as an SNOM), optical characteristics or the shape of a sample are measured by placing a probe comprising an optical medium and having a front end that is sharpened, proximate to the sample to be measured by a distance the size of the wavelength of light or smaller. There has been proposed an apparatus in which a front end of an optical fiber probe having a linear shape is held vertically relative to a sample and is vibrated horizontally relative to a surface of the sample, so that detection of a change in an amplitude of vibration caused by shear force between the surface of the sample and the front end of the probe, is carried out by irradiating a laser beam to the front end of the probe and detecting a change in a shadow thereof and an interval between the front end of the probe and the surface of the sample is maintained constant by moving the sample by a fine movement mechanism such that the amplitude becomes constant to thereby detect a shape of the surface from an intensity of a signal inputted to the fine movement mechanism and measure optical characteristics of the sample.

Figure 11:
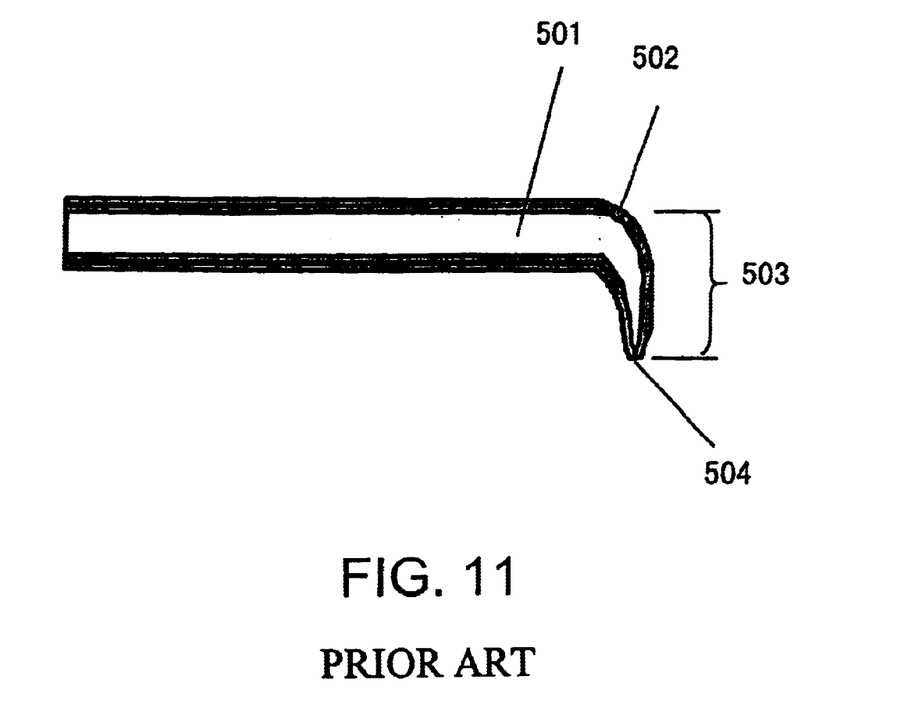
FIG. 11 is a constitution view showing an optical fiber probe according to a conventional example.

Further, there has been proposed a scanning type near-field atomic force microscope using an optical fiber probe formed in a shape of a hook as a cantilever of an atomic force microscope (hereinafter, abbreviated as AFM) to thereby carry out AFM operation and, at the same time, irradiating laser beam from a front end of the optical fiber probe to a sample to thereby detect a shape of a surface of the sample and measure optical characteristics thereof (Japanese Patent Laid-Open No.174542/1995). FIG. 11 is a constitution view showing an optical fiber probe of a conventional example.

According to the optical fiber probe, there is used an optical fiber 501 and a surrounding of the optical fiber 501 is covered with a metal film coating 502. Further, a stylus portion 503 is sharpened and a front end of the stylus portion 503 is provided with an aperture 504.

Meanwhile, according to AFM which is utilized as means for observing a shape of a very small area, there is widely utilized a micro cantilever of silicon or silicon nitride fabricated by a silicon process. The micro cantilever used in AFM is provided with high resonance frequency, excellent mass production performance and small dispersion of shape and therefore, the micro cantilever is characterized in that mechanical properties such as spring constant, resonance frequency and the like are uniform.

In observation by SNOM and AFM, in order to carry out scanning control at high speed, the resonance frequency of the optical fiber probe needs to be high, meanwhile, in order to measure a soft sample such as a sample of an organism which is one of observation objects of SNOM without damaging the sample, spring constant of the optical fiber probe must be reduced. However, according to the optical fiber probe, the optical fiber per se is used as a spring material of the cantilever and therefore, it is difficult to simultaneously realize to increase the resonance frequency and reduce the spring constant and there poses a problem that it is difficult to observe a soft sample at high speed without damaging the sample.

Further, the optical fiber probe is fabricated by manual operation in many steps with the optical fiber as a material and there poses a problem that the mass production performance is low and it is difficult to make uniform a shape thereof such as a diameter of the front end or an angle of the front end.

Hence, the invention has been carried out in view of the above-described and it is an object thereof to provide an optical cantilever which is an optical cantilever for SNOM irradiating and/or detecting light to and from a very small aperture, excellent in mass production performance and uniformity and capable of observing even a soft sample at high speed without damaging the sample and a method of fabricating thereof.

SUMMARY OF THE INVENTION

In order to achieve the above-described object, according to an aspect of the invention, there is provided an optical cantilever comprising a base portion, a cantilever portion extending from the base portion, a dielectric member formed to penetrate the cantilever portion and project above the cantilever on a side opposed to the base portion and having a sharpened front end, a light shielding film for covering a surrounding of the sharpened dielectric member, and a very small aperture formed at the sharpened front end of the dielectric member.

Therefore, according to the optical cantilever of this aspect of the invention, light can be emitted from the very small aperture to the sample by making light incident from the side opposed to the sharpened front end of the dielectric member. Further, light can be detected by the very small aperture. Further, according to the optical cantilever of this aspect of the invention, resonance frequency and spring constant thereof can be adjusted by dimensions of the cantilever portion and accordingly, high resonance frequency and small spring constant can be provided and a soft sample can be observed at high speed without damaging the sample. Further, the optical cantilever according to this aspect of the invention is provided with a shape similar to that of a cantilever of an AFM having a base portion and a cantilever portion extending from the base portion and accordingly, accumulated technology of the AFM can effectively be applied and it is simple to deal therewith.

Further, according to another aspect of invention, there is provided a method of fabricating an optical cantilever characterized in including a step of forming a hole to penetrate a cantilever portion, a step of depositing a dielectric member in the hole, a step of sharpening the dielectric member, and a step of depositing a light shielding film on the sharpened dielectric member and forming a very small aperture.

Therefore, the optical cantilever of the invention can be fabricated by a silicon process, the conventional semiconductor fabricating technology and the technology of fabricating the cantilever of AFM can effectively be applied, which is excellent in mass production performance and uniformity.

Further, according to the optical cantilever of the invention, by providing a step of removing the dielectric member in the method of fabricating thereof, the dielectric portion is constituted by a cavity.

Therefore, absorption of light in the atmosphere or in vacuum at the dielectric member can be disregarded and therefore, there can be widely selected a wavelength range which can be used by incident light.

Further, according to the optical cantilever of the invention, the face on the side opposed to the sharpened front end of the dielectric member is constituted by a projected shape. Thereby, light can be focused to the very small aperture portion and accordingly, the intensity of emitted light can be increased.

Further, according to the optical cantilever of the invention, the face on the side opposed to the sharpened front end of the dielectric member is formed at a position not projected from the surface of the cantilever portion on the side the same as the side of the base portion. Thereby, introduced light reflected by the dielectric member on the side opposed to the sharpened front end of the dielectric member is not leaked and the S/N ratio in measurement by SNOM can be increased.

Further, according to the optical cantilever of the invention, in a method of fabricating the optical cantilever, there is provided a step of adjusting a thickness of the cantilever by thinning the cantilever portion from a direction of depositing dielectric member, thereby, the height of the dielectric member having the sharpened front end can be increased and observation of a sample having a large stepped difference and observation in a solution can easily be carried out.

Further, the optical cantilever of the invention is constituted by an optical cantilever characterized in having a cantilever for an optical lever integral with the cantilever portion on the side opposed to the sharpened dielectric member relative to a fulcrum of the cantilever portion. Therefore, by irradiating laser beam of optical lever to the cantilever for an optical lever, light for observing the optical characteristics of the sample and light for measuring displacement of the cantilever can be separated from each other and accordingly, the S/N ratio in observation by SNOM can be increased. Further, by making the length of the cantilever for optical lever larger than the length of the cantilever portion, the sensitivity in measuring displacement of the cantilever can be increased.

BEST MODE FOR CARRYING OUT THE INVENTION

[Embodiment 1]

Figure 1:
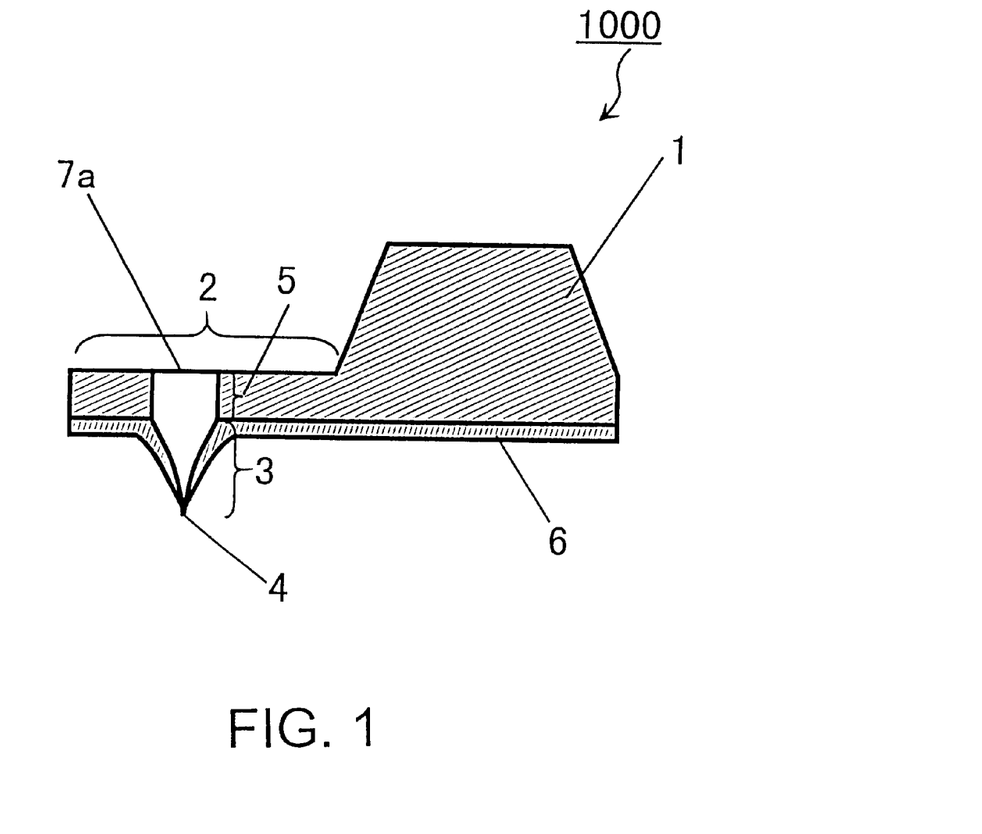
FIG. 1 is a constitution view showing a constitution of an optical cantilever according to Embodiment 1 of the invention.

FIG. 1 is a constitution view showing a constitution of an optical cantilever 1000 according to Embodiment 1 of the invention. The optical cantilever 1000 is constituted by a base portion 1, a cantilever portion 2 extended from the base portion 1, a light introducing portion 7a formed at a vicinity of a front end of the cantilever portion 2, a light propagating portion 5 penetrating the cantilever portion 2 from the light introducing portion 7a, a light propagating tip 3 having a taper shape and a very small aperture 4 formed at a front end of the light propagating tip 3. At least a surrounding of the very small aperture 4 and the light propagating tip 3 are covered with a light shielding film 6.

The length, width and thickness of the cantilever portion 2 are, for example, 200 micrometers, 50 micrometers and 5 micrometers, respectively. The height of the light propagating tip 3 is, for example, 10 micrometers. Further, the light propagating tip 3 is formed in a shape of a circular cone or a pyramid, a radius of curvature of a front end thereof is, for example, several tens of nanometers and a size of the very small aperture 4 is, for example, 100 nanometers. The diameter of the light introducing portion 7a is, for example, 30 micrometers. The diameter of the light propagating portion 5 is the same as the diameter of the light introducing portion 7a which is, for example, 30 micrometers and a thickness of the light propagating portion 5 is the same as the thickness of the cantilever portion 2 which is, for example, 5 micrometers. The thickness of the light shielding film 6 is, for example, 200 nanometers. The base portion 1 and the cantilever portion 2 are made of, for example, silicon or quartz. The light propagating portion 5 and the light propagating tip 3 may be formed by a dielectric member such as silicon dioxide or polyimide or may be cavities. Further, a metal reflecting light such as aluminum or gold is used for the light shielding film 6.

Figure 2:
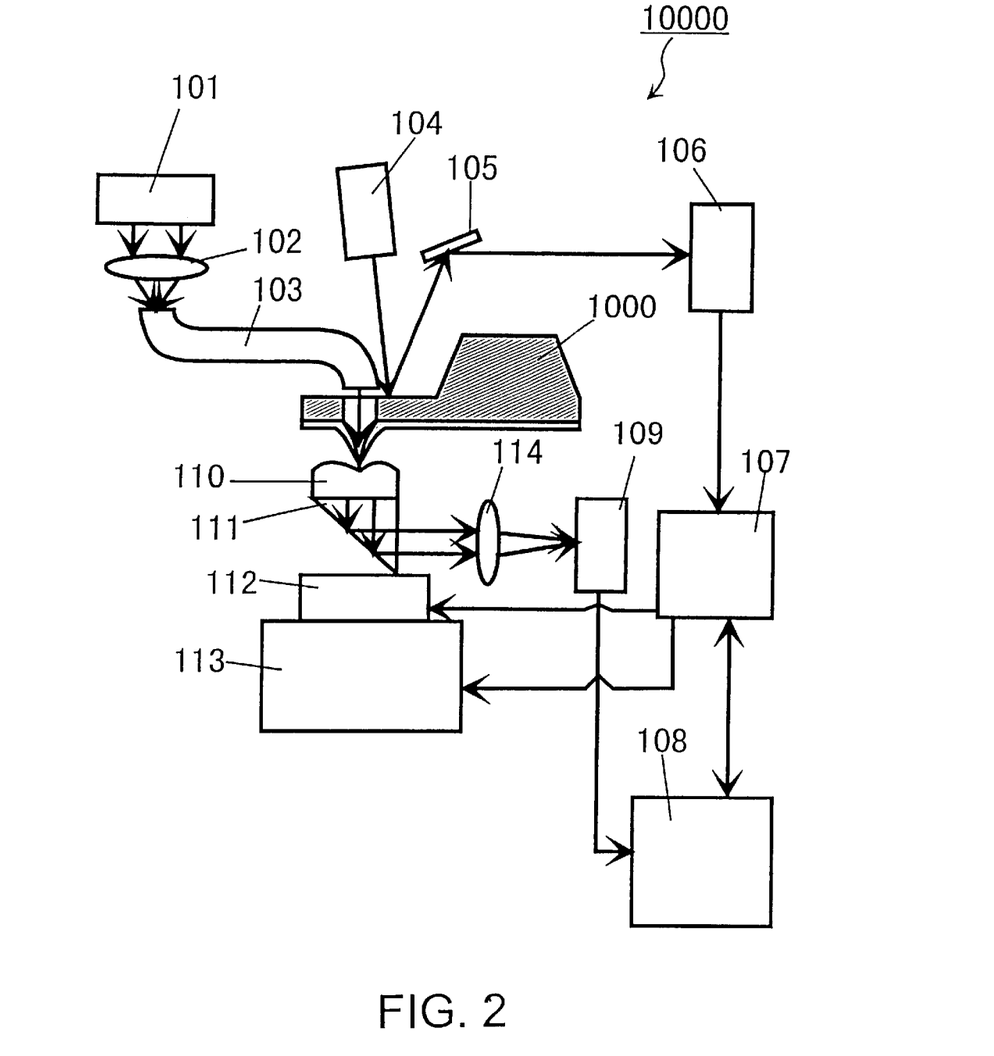
FIG. 2 is a constitution view showing a constitution of a scanning probe microscope mounted with the optical cantilever according to Embodiment 1 of the invention.

FIG. 2 is a view showing a scanning type probe microscope 10000 mounted with the optical cantilever 1000 according to Embodiment 1 of the invention. In this case, for simplicity, an explanation will be given of a case in which the optical cantilever 1000 is controlled in a contact mode. The scanning type probe microscope 10000 is provided with the optical cantilever 1000 shown in FIG. 1, a light source 101 for producing light used for measuring optical information, a lens 102 arranged in front of a light source 101, an optical fiber 103 for propagating light focused by the lens 102 to the optical cantilever 1000, a prism 111 arranged below a sample 110 for reflecting propagated light generated at the front end of the light propagating tip, a lens 114 for focusing propagated light reflected by the prism 111 and a light detecting portion 109 for receiving focused propagated light.

Further, above the optical cantilever 1000, there are provided a laser oscillator 104 for outputting laser beam, a mirror 105 for reflecting laser beam reflected by the cantilever portion 2 of the optical cantilever 1000 and a photoelectric conversion portion 106 divided in two upwardly and downwardly for receiving and photoelectrically converting reflected laser beam. Further, there are provided a rough movement mechanism 113 and a fine movement mechanism 112 for controlling to move the sample 110 and the prism 111 in XYZ directions, a servo mechanism 107 for driving the rough movement mechanism 113 and the fine movement mechanism 112 and a computer 108 for controlling a total of the apparatus.

Next, an explanation will be given of operation of the scanning type probe microscope 10000. A laser beam emitted from the laser oscillator 104 is reflected by an upper side of the cantilever portion 2 of the optical cantilever 1000. When the very small aperture 4 and a surface of the sample 110 become proximate to each other, the cantilever portion 2 of the optical cantilever 1000 is bent by attractive force or repulsive force between the very small aperture 4 and the sample 110. Therefore, an optical path of the reflected laser beam is changed and the change is detected by the photoelectric conversion portion 106.

A signal detected by the photoelectric conversion portion 106 is transmitted to the servo mechanism 107. The servo mechanism 107 controls the rough movement mechanism 113 and the fine movement mechanism 112 based on a signal detected by the photoelectric conversion portion 106 such that the approach distance of the optical cantilever 1000 relative to the sample 110 and bending of the optical cantilever in observing the surface becomes constant. The computer 108 receives information of a shape of the surface from a control signal of the servo mechanism 107.

Further, light emitted from the light source 101 is focused by the lens 102 and reaches the optical fiber 103. Light which has passed through inside of the optical fiber 103, is introduced to the light introducing portion of the optical cantilever 1000 as incident light and is irradiated from the very small aperture to the sample 110. Meanwhile, optical information of the sample 110 reflected by the prism 111, is focused by the lens 114 and is introduced to the light detecting portion 109. A signal of the light detecting portion 109 is acquired via an analog input interface of the computer 108 and is detected by the computer 108 as optical information.

Further, according to the scanning type probe microscope 10000, as a method of controlling a distance between the sample and the light propagating tip 3, observation can be carried out also by a dynamic mode in which the optical cantilever 1000 is made proximate to the sample in an excited state and the rough movement mechanism 113 and the fine movement mechanism 112 are controlled by the servo mechanism 107 such that an amplitude of the cantilever becomes constant.

Figure 3:
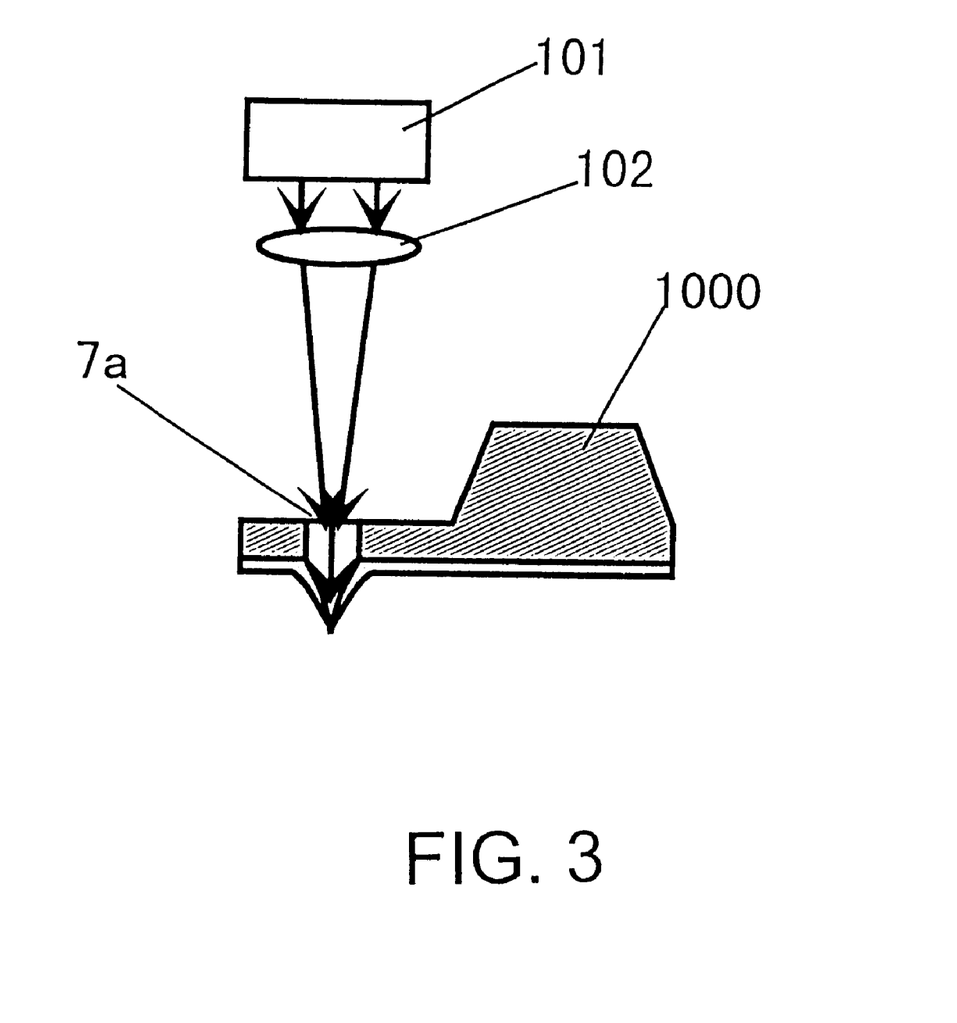
FIG. 3 is a constitution view showing other example of a method of introducing light to the optical cantilever according to Embodiment 1 of the invention.

FIG. 3 is a constitution view showing other example of a method of introducing light to the optical cantilever 1000 according to Embodiment 1. In introducing light to the optical cantilever 1000, other than the method explained in reference to FIG. 2, as shown by FIG. 3, light may be introduced directly to the light introducing portion 7a by the light source 101 for measuring optical information and the lens 102 arranged in front of the light source 101.

Although according to the above-described, an explanation has been given of a case of observing the sample by an illumination mode irradiating light from the very small aperture 4, according to the scanning type probe microscope 10000, the sample can be measured also by a collection mode for detecting light at the very small aperture of the optical cantilever 100 by placing an optical detector in place of the light source 101 for measuring optical information in FIG. 2 and FIG. 3.

Figure 4:
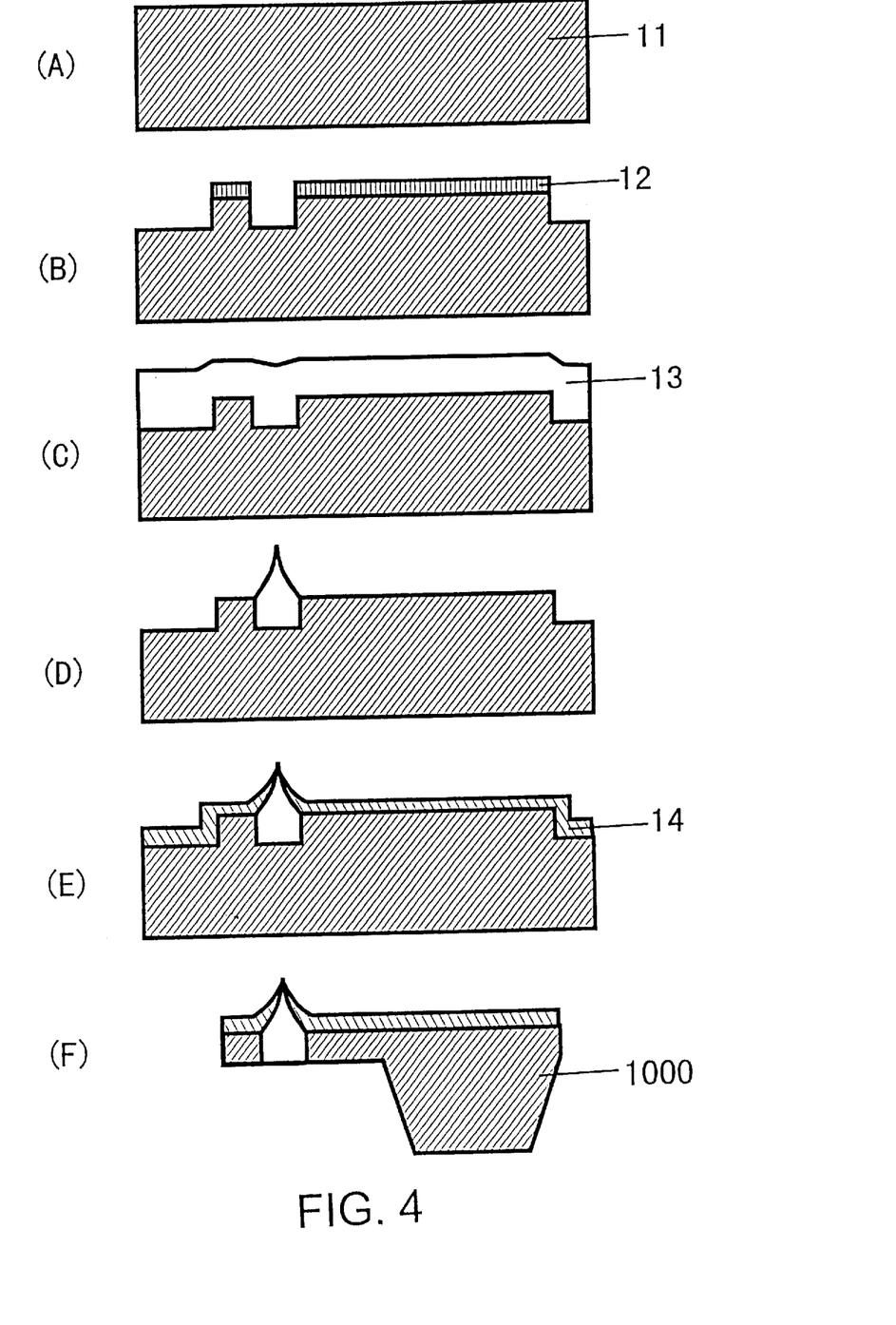
FIG. 4 is an explanatory view showing a method of fabricating the optical cantilever according to Embodiment 1 of the invention.

FIG. 4 illustrates views showing an example of steps of fabricating the optical cantilever 1000 according to Embodiment 1. FIG. 4(A) shows a substrate 11. Further, in the following, an upper face of the substrate 11 is defined as a surface thereof and a lower face thereof is defined as a rear face thereof. The substrate 11 is made of, for example, silicon or quartz.

FIG. 4(B) shows a step of forming the cantilever portion and a hole penetrating the cantilever portion. An etching mask 12 comprises silicon dioxide, a photoresist or the like. The cantilever portion and the hole penetrating the cantilever portion can be formed by forming the etching mask 12 by using photolithography and thereafter fabricating the cantilever portion and the hole by an anisotropic dry etching starting from reactive ion etching.

FIG. 4(C) shows a step of depositing a dielectric member 13 for constituting the light propagating tip.

After the step shown by FIG. 4(B), by a plasma gas phase synthesizing process or spin coating, dielectric member such as silicon dioxide, polyimide or the like is deposited on the surface of the substrate 11.

FIG. 4(D) shows a step of forming the light propagating tip. A taper portion of the light propagation tip is formed by forming a mask at a portion on the dielectric member deposited by the preceding step for constituting the light propagating tip by photolithography and thereafter carrying out isotropic dry etching or isotropic wet etching.

FIG. 4(E) shows a step of depositing a light shielding film 14 and forming the very small aperture. The light shielding film 14 is formed on the surface of the substrate 11 by sputtering or vacuum deposition. Thereafter, by dry etching or wet etching, the light shielding film 14 at the front end of the light propagating tip is removed and the very small aperture is formed.

FIG. 4(F) shows a step for separating the optical cantilever 1000 from the substrate 11. The optical cantilever 1000 can be separated from the substrate 11 by anisotropic wet etching or anisotropic dry etching from the rear face of the substrate 11 and at the same time, the light introducing portion can be formed. Further, when the light propagating portion and the light propagating tip are cavities, after the step of FIG. 4(F), portions in correspondence with the light propagating tip and the light propagating portion are removed by dry etching or wet etching.

The optical cantilever 1000 fabricated by the above-described steps, can emit light which has propagated the light propagating tip 3 from the very small aperture 4 toward the sample by introducing light from the light introducing portion 7a shown by FIG. 1 and FIG. 3. Further, the optical cantilever 1000 can be operated as the optical cantilever of the scanning type probe microscope as shown by FIG. 2. Further, by forming the shape of the cantilever portion 2 of the optical cantilever 1000 to be 100 through 1000 micrometers in length, 20 through 100 micrometers in width and 2 through 10 micrometers in thickness, the spring constant and the resonance frequency of the cantilever portion 2 can be adjusted in a range of 0.1 through 50 N/m (Newton/meter) and 10 through 300 kHz (Kilo Hertz) and even a soft sample can be measured at high speed without damaging the sample. Further, the optical cantilever 1000 can be fabricated by using a semiconductor process and accordingly, there can be fabricated the optical cantilever 1000 excellent in mass production performance and uniformity. Further, the optical cantilever 1000 is provided with a shape similar to that of conventional AFM and therefore, it is simple to deal therewith.

Further, when the light propagating portion 5 and the light propagating tip 3 are filled with a dielectric member, depending on wavelength of incident light, the incident light is absorbed by the dielectric member. However, when the light propagating portion 5 and the light propagating tip 3 are cavities, absorption in the atmosphere or in vacuum can be disregarded and therefore, there can be widely selected a wavelength range which can be used for the incident light.

[Embodiment 2]

Figure 5:
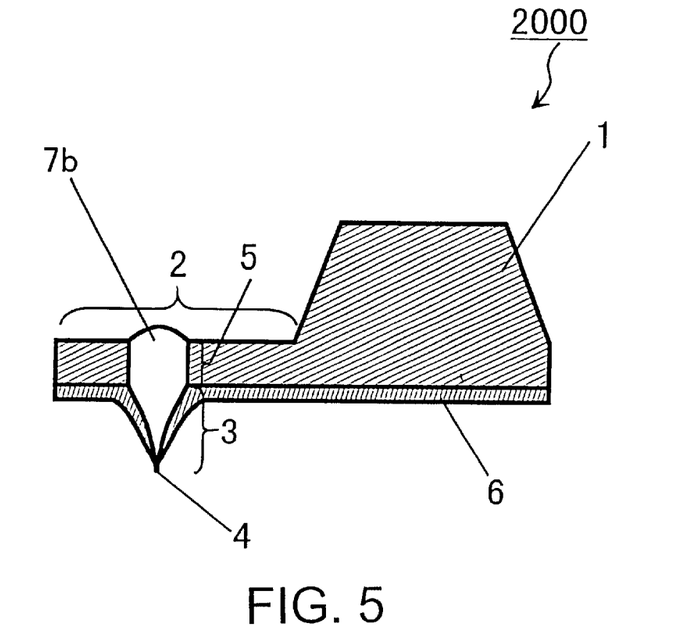
FIG. 5 is a constitution view showing a constitution of an optical cantilever according to Embodiment 2 of the invention.

FIG. 5 is a constitution view showing a constitution of an optical cantilever 2000 according to Embodiment 2 of the invention. The optical cantilever 2000 is characterized in that a light introducing portion 7b is provided with a projected shape. Although a radius of curvature of the projected portion of the light introducing portion 7b is, for example, 40 micrometers, depending on the height of the light propagating tip 3 and a difference of the material of the light propagating portion 5 and the light propagating tip 3, there is provided an optical value thereof for focusing light incident on the light introducing portion 7b to the very small aperture 4. Other elements constituting the optical cantilever 2000 are similar to those in Embodiment 1. However, the light propagating portion 5 and the light propagating tip 3 are not constituted by cavities.

The optical cantilever 2000 according to Embodiment 2 of the invention can be used similar to the optical cantilever 1000 in the scanning type probe microscope 10000 shown in FIG. 2.

Further, the optical cantilever 2000 according to Embodiment 2 of the invention can be fabricated by steps similar to those in the method of fabricating the optical cantilever 1000 shown in FIG. 4. The projected shape of the light introducing portion 7b of the optical cantilever 2000 can be fabricated by fabricating a bottom face of the hole penetrating the cantilever portion 2 in a recessed shape in the step shown by FIG. 4(B).

According to the optical cantilever 2000 of Embodiment 2 of the invention, other than the effect explained in Embodiment 1, since the light introducing portion 7b is provided with the projected shape, incident light introduced to the optical cantilever 2000 can be focused to the very small aperture 4 and the intensity of emitted light from the very small aperture 4 can be increased.

[Embodiment 3]

Figure 6:
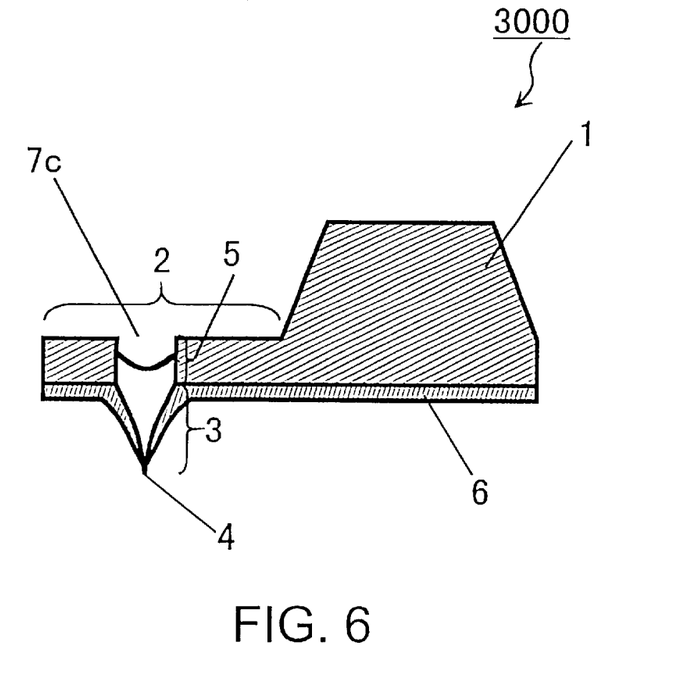
FIG. 6 is a constitution view showing a constitution of an optical cantilever according to Embodiment 3 of the invention.

FIG. 6 is a constitution view showing a constitution of an optical cantilever 3000 according to Embodiment 3 of the invention. The optical cantilever 3000 is characterized in that a light introducing portion 7c is provided with a shape recessed from the cantilever portion 2. A stepped difference at a recessed portion of the light introducing portion 7C is, for example, 10 through 50 micrometers. Other elements constituting the optical cantilever 3000 are similar to those in Embodiment 1.

The optical cantilever 3000 according to Embodiment 3 of the invention can be used similar to the optical cantilever 1000 of the scanning type probe microscope 10000 shown in FIG. 2.

Further, the optical cantilever 3000 according to Embodiment 3 of the invention can be fabricated by steps similar to those in the method of fabricating the optical cantilever 1000 shown in FIG. 4. The recessed portion at the light introducing portion 7c of the optical cantilever 2000 is formed by subjecting a portion constituting the light propagating portion 5 to further dry etching from the side of the base portion 1 after the step shown by FIG. 4(F).

According to the optical cantilever 3000 with regard to Embodiment 3 of the invention, other than the effect explained in Embodiment 1, since the light introducing portion 7c is disposed at a position recessed from the cantilever portion 2, the reflected light of light introduced into the optical cantilever 3000 can be prevented from leaking to other portions and the S/N ratio in measurement can be increased.

[Embodiment 4]

Figure 7:
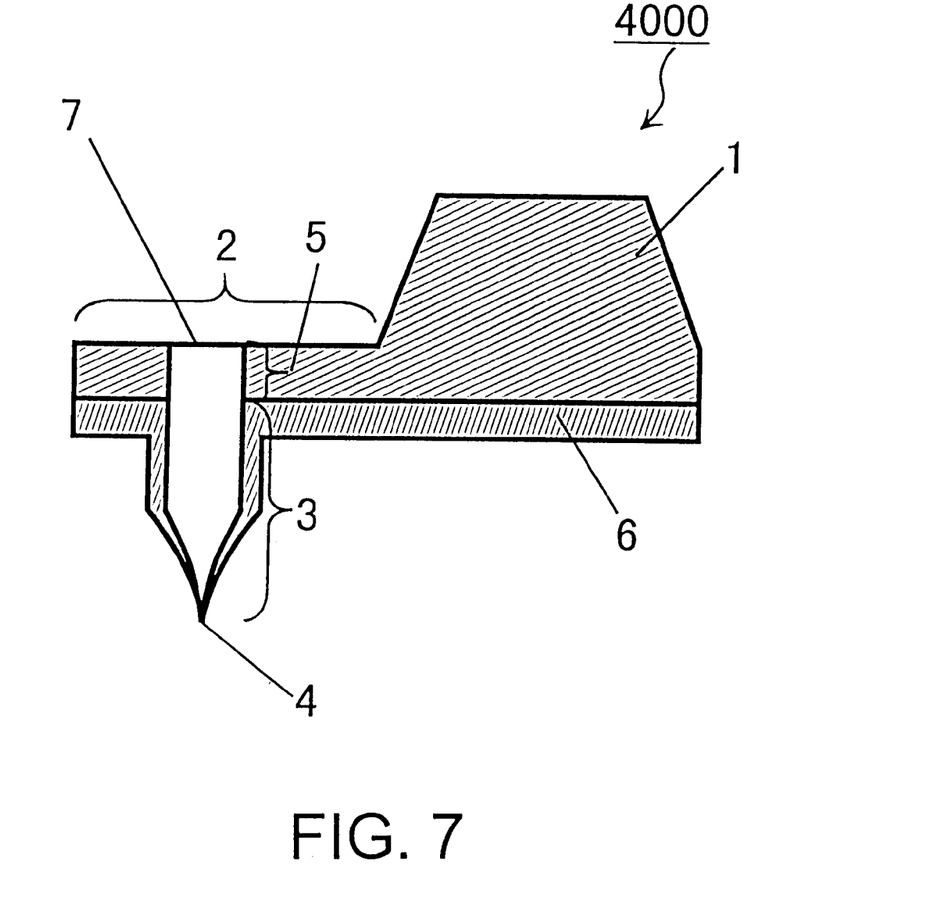
FIG. 7 is a constitution view showing a constitution of an optical cantilever according to Embodiment 4 of the invention.

FIG. 7 is a constitution view showing a constitution of an optical cantilever 4000 according to Embodiment 4 of the invention. The optical cantilever 4000 is characterized in that the height of the light propagating tip 3 is, for example, 20 micrometers and is provided with a sufficiently large height in comparison with that of the optical cantilevers of Embodiments 1 through 3. A light introducing portion 7 may be formed by any of the shapes of Embodiment 1 through Embodiment 3. Other elements of the optical cantilever 4000 are similar to those of the optical cantilevers of Embodiment 1 through Embodiment 3.

Further, the optical cantilever 4000 can be used similar to the optical cantilever 1000 of the scanning type probe microscope 10000 shown in FIG. 2.

Figure 8:
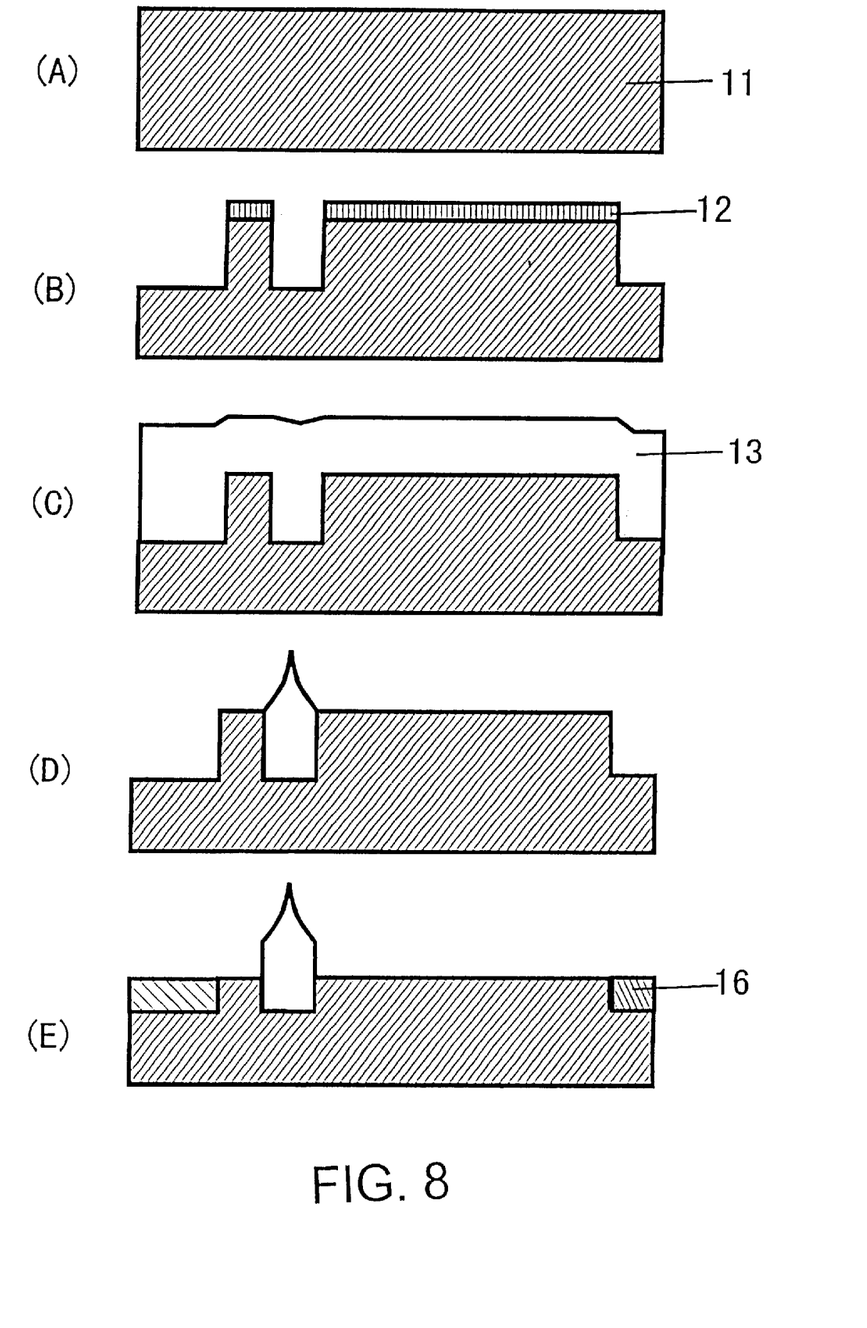
FIG. 8 is an explanatory view showing a method of fabricating the optical cantilever according to Embodiment 4 of the invention.

FIG. 8 illustrates views showing an example of steps of fabricating the optical cantilever 4000 according to Embodiment 4. FIG. 8(A) shows the substrate 11. Further, in the following, the upper face of the substrate 11 is defined as the front face and the lower face is defined as the rear face. The substrate 11 is made of, for example, silicon or quartz.

FIG. 8(B) shows a step of forming the cantilever portion 2 and a hole penetrating the cantilever portion 2 in a substrate 11. The etching mask 12 comprises silicon dioxide or a photoresist. The cantilever portion and the hole penetrating the cantilever portion can be formed by forming the etching mask 12 by using photolithography and thereafter fabricating the cantilever portion and the hole by an anisotropic dry etching starting from reactive ion etching.

A fabricated depth at this occasion is sufficiently deep in comparison with that in the case of Embodiment 1. Further, when a light introducing portion of the optical cantilever 4000 is formed in a projected shape similar to the light introducing portion of Embodiment 2, a bottom face of the hole penetrating the cantilever portion 2 is fabricated in a recessed shape.

FIG. 8(C) shows a step of depositing the dielectric member 13 constituting the light propagating tip. After the step shown by FIG. 8(B), by a plasma gas phase synthesizing process or spin coating, a dielectric member of silicon dioxide or polyamide or the like is deposited on the surface of the substrate 11.

FIG. 8(D) shows a step of sharpening the light propagating tip. The sharpened light propagating tip is formed by isotropic dry etching or isotropic wet etching.

FIG. 8(E) shows a step of forming the light propagating tip. The light propagating tip is formed by covering portions other than portions constituting the cantilever portion and the base portion by a mask 16 and thinning the substrate 11 by dry etching or wet etching. By the step, the light propagating tip can be provided with a sufficiently large height in comparison with that in the case explained in Embodiment 1.

Thereafter, a step of depositing the light shielding film and forming the very small aperture and a step of separating the optical cantilever 4000 from the substrate 11 are the same as the steps explained in reference to FIG. 4(E) and FIG. 4(F) of Embodiment 1. Further, a step of forming the light introducing portion of the optical cantilever 4000 in the recessed shape is the same as the step explained in Embodiment 3.

According to the optical cantilever 4000 explained in Embodiment 4 of the invention, other than the effect explained in Embodiments 1 through 3, since the height of the light propagating tip 3 can be made as large as 20 through 200 micrometers, a sample having a large stepped difference can be measured. Further, according to the optical cantilever 4000, since the height of the light propagating tip 3 is large, in observation in a solution, only the light propagating tip having a shape of a prism or a circular cylinder can enter the solution without dipping the cantilever portion 2 in a shape of a plate into the solution and therefore, operation in the solution is stabilized.

[Embodiment 5]

Figure 9:
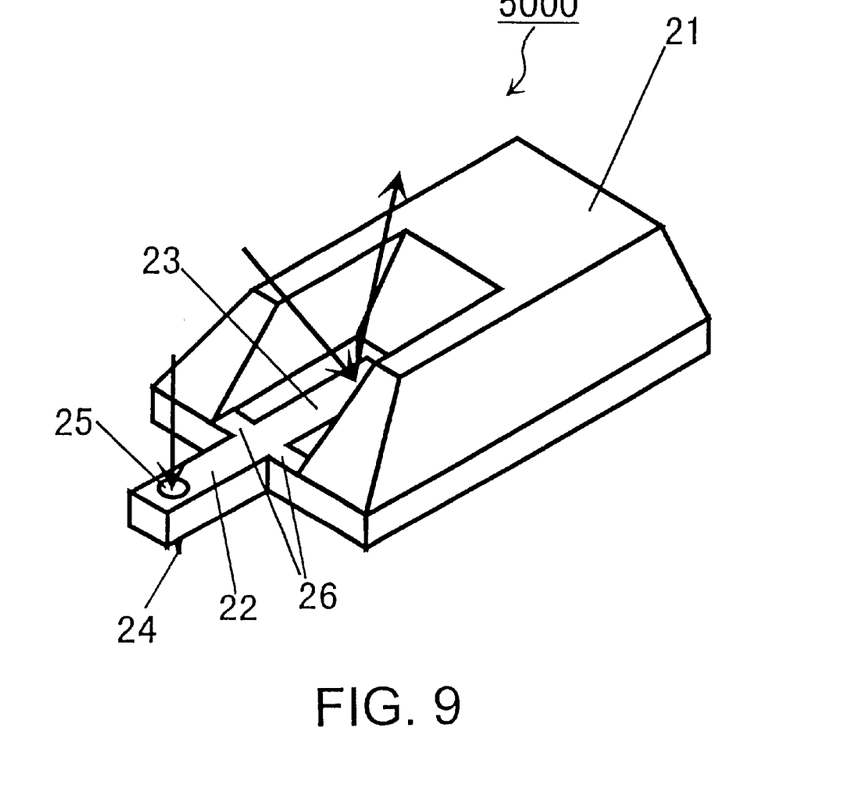
FIG. 9 is a perspective view showing a constitution of an optical cantilever according to Embodiment 5 of the invention.
Figure 10:
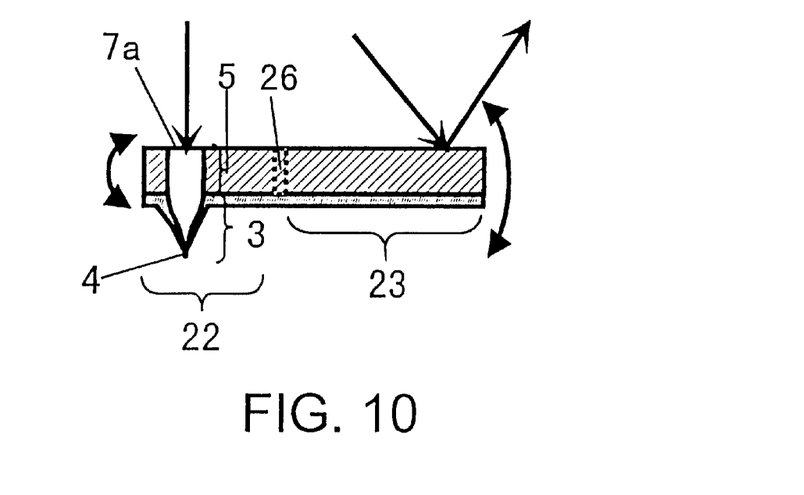
FIG. 10 is a sectional of a cantilever portion showing the constitution of the optical cantilever according to Embodiment 5 of the invention.

FIG. 9 and FIG. 10 are a perspective view showing the construction of an optical cantilever 5000 according to Embodiment 5 of the invention and a sectional view of a cantilever portion thereof. The optical cantilever 5000 has a cantilever 23 for an optical lever and a lever fulcrum 26. Other elements of the optical cantilever 5000 are similar to those in Embodiments 1 through 4. Further, a material of the cantilever 23 for the optical lever and the lever fulcrum 26 is the same as that of a base portion 21 and a cantilever portion 22. Further, a length of the cantilever 23 for an optical lever is, for example, 300 through 2000 micrometers, a length of the cantilever portion 22 is, for example, 100 through 1000 micrometers and the cantilever 23 for an optical lever can be provided with the length larger than that of the cantilever portion 22.

The optical cantilever 5000 can be used similar to the optical cantilever 1000 of the scanning type probe microscope 1000 shown in FIG. 2 and can be used both in the contact mode and the dynamic mode. An explanation will be given of operation thereof in the case of the contact mode as follows. Laser beam emitted from the laser oscillator 104 is reflected by an upper portion of the cantilever 23 for an optical lever. When the cantilever portion 22 is displaced by attractive force or repulsive force between the cantilever portion 22 and a sample, at the same time, the cantilever 23 for an optical lever is also displaced with the cantilever fulcrum 26 as a base point. Therefore, an optical path of laser beam reflected by the upper face of the cantilever 23 for an optical lever is changed and accordingly, the change is detected by the photoelectric conversion portion 106. Successive operation is similar to that of Embodiment 1 and a method of acquiring an optical image is similar to that in Embodiment 1.

Further, also in the case of the dynamic mode, the shape of the surface can be measured by irradiating laser beam of optical lever to the cantilever 23 for the optical lever and controlling the rough movement mechanism 113 and the fine movement mechanism 112 by the servo mechanism 107 such that an amplitude of the cantilever for an optical lever becomes constant.

A method of fabricating the optical cantilever 5000 is similar to those of Embodiment 1 through Embodiment 4 except that the shape of the cantilever differs.

According to the optical cantilever 5000 with regard to Embodiment 5 of the invention, other than the effect explained in Embodiment 1 through Embodiment 4, since the laser beam of the optical lever is not irradiated to the cantilever portion 22, light for observing the optical characteristics of the sample and laser beam for the optical lever can completely be separated from each other and accordingly, the S/N ratio in observation by SNOM is promoted. Further, when the length of the cantilever 23 for the optical lever is larger than the length of the cantilever portion 22, an amount of displacing the cantilever 23 for the optical lever becomes larger than an amount of displacing the cantilever portion 22 and accordingly, a sensitivity of detecting a displacement of the cantilever by the optical lever is promoted.

INDUSTRIAL APPLICABILITY

As has been explained above, according to the invention, the optical cantilever can carry out measurement by SNOM and provided with a structure similar to that of a conventional cantilever of AFM and accordingly, there is provided the optical cantilever having high resonance frequency and small spring constant in comparison with those of the conventional optical fiber probe and even a soft sample can be measured at high speed. Further, when the dielectric member is air, the light propagating portion and the light propagating tip are constituted by cavities and therefore, absorption in the atmosphere or in vacuum can be disregarded and there can be widely selected a wavelength range which can be used by incident light.

Further, according to the invention of the optical cantilever, other than the effect, the face on the side opposed to the sharpened front end of the dielectric member is provided with the projected shape and accordingly, incident light introduced to the optical cantilever can be focused to the very small aperture and intensity of the emitted light from the very small aperture can be increased.

Further, according to the invention of the optical cantilever, other than the effect explained, the face on the side opposed to the sharpened front end of the dielectric member is disposed at a position recessed from the cantilever portion and accordingly, reflected light of light introduced to the optical cantilever can be prevented from leaking to other portion and the S/N ratio in measurement can be increased.

Further, according to the invention of the optical cantilever, other than the effect explained, laser beam of optical lever is not irradiated to the cantilever portion and accordingly, light for observing the optical characteristics of the sample and laser beam for optical lever can completely be separated from each other and therefore, stability of measurement by SNOM is promoted. Further, when the length of the cantilever for the optical lever is larger than the length of cantilever portion, the amount of displacing the cantilever for the optical lever becomes larger than the amount of displacing the cantilever portion and a sensitivity of detecting displacement of the cantilever by the optical lever is promoted.

Further, according to the invention with, the silicon process is used and accordingly, the optical cantilever explained can simply be fabricated with excellent mass production performance and uniformity.

Further, according to the invention with, the height of the sharpened dielectric member can be made as large as 20 through 200 micrometers and the optical cantilever capable of measuring a sample having a large stepped difference can simply be fabricated with excellent mass production performance and uniformity. Further, according to the optical cantilever fabricated by the fabrication method, the height of the sharpened dielectric member is large and accordingly, in observation in a solution, only the light propagating tip having a shape of a prism or a circular cylinder enters the solution without dipping a cantilever portion in a shape of a plate in the solution and accordingly, operation in the solution is stabilized.

What is claimed is:

1. A method of fabricating an optical cantilever comprising:
   - a step of forming a base portion and a cantilever portion extending from the base portion;
   - a step of forming a hole to penetrate the cantilever portion;
   - a step of depositing a dielectric member in the hole;
   - a step of sharpening the dielectric member to form a sharpened tip at a first end thereof projecting outward of a first surface of the cantilever portion by forming a mask on the dielectric member and etching the dielectric member by isotropic dry etching or isotropic wet etching; and
   - a step of depositing a light shielding film on the first surface of the cantilever portion and the sharpened dielectric member except for a tip thereof so as to provide a very small aperture at the tip.

2. A method of fabricating an optical cantilever according to claim 1; further comprising the step of adjusting a thickness of the cantilever portion by thinning the cantilever portion from a direction in which the dielectric member is deposited.

3. A method of fabricating an optical cantilever according to claim 1; further comprising the step of partially removing the dielectric member.

4. A method of fabricating an optical cantilever according to claim 1; further comprising the step of preventing a face of the dielectric member opposite the sharpened front end from projecting from a face of the cantilever portion.

5. A method of fabricating an optical cantilever according to claim 1; wherein the step of forming a base portion and a cantilever portion are performed by etching a silicon substrate; and the step of forming a hole to penetrate the cantilever portion is performed by dry etching the hole in the silicon substrate.

6. A method of fabricating an optical cantilever according to claim 1; wherein the step of depositing the dielectric member is performed by one of a gas phase synthesizing process or spin coating.

7. A method of fabricating an optical cantilever according to claim 2 wherein the step of adjusting the thickness of the cantilever portion by thinning the cantilever portion from the direction in which the dielectric member is deposited is performed by dry etching.

8. A method of fabricating an optical cantilever comprising:
   - a step of forming a base portion and a cantilever portion extending from the base portion;
   - a step of forming a hole to penetrate the cantilever portion;
   - a step of depositing a dielectric member in the hole;
   - a step of sharpening the dielectric member to form a sharpened tip at a first end thereof projecting outward of a first surface of the cantilever portion; and
   - a step of depositing a light shielding film on the first surface of the cantilever portion and on the sharpened dielectric member except for a tip thereof so as to provide a very small aperture at the tip, by depositing a metal on the sharpened dielectric member and removing the metal at the sharpened tip of the dielectric member by dry etching or wet etching.

9. A method of fabricating an optical cantilever comprising:
   - a step of forming a base portion and a cantilever portion extending from the base portion;
   - a step of forming a hole to penetrate the cantilever portion;
   - a step of depositing a dielectric member in the hole;
   - a step of sharpening the dielectric member to form a sharpened tip at a first end thereof protecting outward of a first surface of the cantilever portion;
   - a step of depositing a light shielding film on the first surface of the cantilever portion and on the sharpened dielectric member except for a tip thereof so as to provide a very small aperture at the tip; and
   - partially removing the dielectric member by dry etching or wet etching from a side opposed to the sharpened tip of the dielectric member.

10. A method of fabricating an optical cantilever comprising:
    - a step of forming a base portion and a cantilever portion extending from the base portion;
    - a step of forming a hole to penetrate the cantilever portion;
    - a step of depositing a dielectric member in the hole;
    - a step of sharpening the dielectric member to form a sharpened tip at a first end thereof projecting outward of a first surface of the cantilever portion;
    - a step of depositing a light shielding film on the first surface of the cantilever portion and on the sharpened dielectric member except for a tip thereof so as to provide a very small aperture at the tip; and
    - preventing a face of the dielectric member opposite the sharpened front end from projecting from a face of the cantilever portion by dry etching or wet etching from a face on a side opposed to the sharpened tip of the dielectric member.

* * * * *